(12) United States Patent
McDowell et al.

(10) Patent No.: US 7,694,324 B2
(45) Date of Patent: *Apr. 6, 2010

(54) RENDERING GRAPHICS/IMAGE DATA USING DYNAMICALLY GENERATED VIDEO STREAMS

(75) Inventors: Brian C. McDowell, Woodinville, WA (US); Stephen S. Evans, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1145 days.

This patent is subject to a terminal disclaimer.

(21) Appl. No.: 10/955,358

(22) Filed: Sep. 30, 2004

(65) Prior Publication Data

US 2006/0037054 A1  Feb. 16, 2006

Related U.S. Application Data

(63) Continuation of application No. 10/917,645, filed on Aug. 13, 2004.

(51) Int. Cl.
*H04N 7/173* (2006.01)

(52) U.S. Cl. ............ 725/133; 725/80; 725/82; 709/228; 348/552

(58) Field of Classification Search ......... 348/552; 725/82, 80

See application file for complete search history.

(56) References Cited

U.S. PATENT DOCUMENTS

| | | | |
|---|---|---|---|
| 6,085,247 A | 7/2000 | Parsons | |
| 6,651,252 B1 * | 11/2003 | Gordon et al. | 725/54 |
| 6,728,753 B1 | 4/2004 | Parasnis | |
| 6,750,860 B1 | 6/2004 | Shum | |
| 2002/0161895 A1 * | 10/2002 | Appiah et al. | 709/227 |
| 2002/0196378 A1 * | 12/2002 | Slobodin et al. | 348/744 |
| 2003/0005130 A1 * | 1/2003 | Cheng | 709/228 |
| 2006/0037052 A1 | 2/2006 | McDowell | |
| 2006/0037053 A1 | 2/2006 | McDowell | |
| 2008/0016255 A1 * | 1/2008 | Saint-Hilaire et al. | 710/11 |

OTHER PUBLICATIONS

Bo Li et al., "An MPEG-4 Based Interactive Multimedia System," IEEE Globecom, vol. 2, Nov. 1998, pp. 678-683.

K. Tsukamoto, et al., "Develpoment of Home Video Server 'Digital Video Station'," NEC Research and Development, vol. 41, Issue 2, Apr. 2000, pp. 156-159.

Maclaren, N.M., "User Experiences with the X Windowing System," University of Cambridge SM 90 Programme Preface, vol. 1, Apr. 1990, pp. 303-312.

Office Action dated Feb. 5, 2008 cited in related U.S. Appl. No. 10/917,645.

(Continued)

*Primary Examiner*—Joseph P Hirl
*Assistant Examiner*—Joshua Taylor
(74) *Attorney, Agent, or Firm*—Workman Nydegger

(57) ABSTRACT

The present invention provides for rendering graphics/image data at an electronic device that typically has limited resources. A video data steam is received at an electronic device, the video data stream including either user interface information or slideshow presentation data coded in a video codec format. A video processor of the electronic device is used to decode at least a portion of the video data stream into video frame data. A portion of the user interface or slideshow presentation is then displayed as video from data on a display of the electronic device.

23 Claims, 4 Drawing Sheets

OTHER PUBLICATIONS

Office Action dated Jul. 21, 2008 cited in related U.S. Appl. No. 10/917,645.
Office Action dated Aug. 1, 2008 cited in U.S. Appl. No. 10/954,717.
Office Action dated Nov. 26, 2008 cited in U.S. Appl. No. 10/917,645.
Office Action dated Dec. 9, 2008 cited in U.S. Appl. No. 10/954,717.
Office Action dated Dec. 31, 2008 cited in U.S. Appl. No. 10/955,211.
Notice of Allowance dated Jun. 24, 2009 cited in U.S. Appl. No. 10/954,717.
Notice of Allowance dated Jul. 2, 2009 cited in U.S. Appl. No. 10/917,645.

* cited by examiner

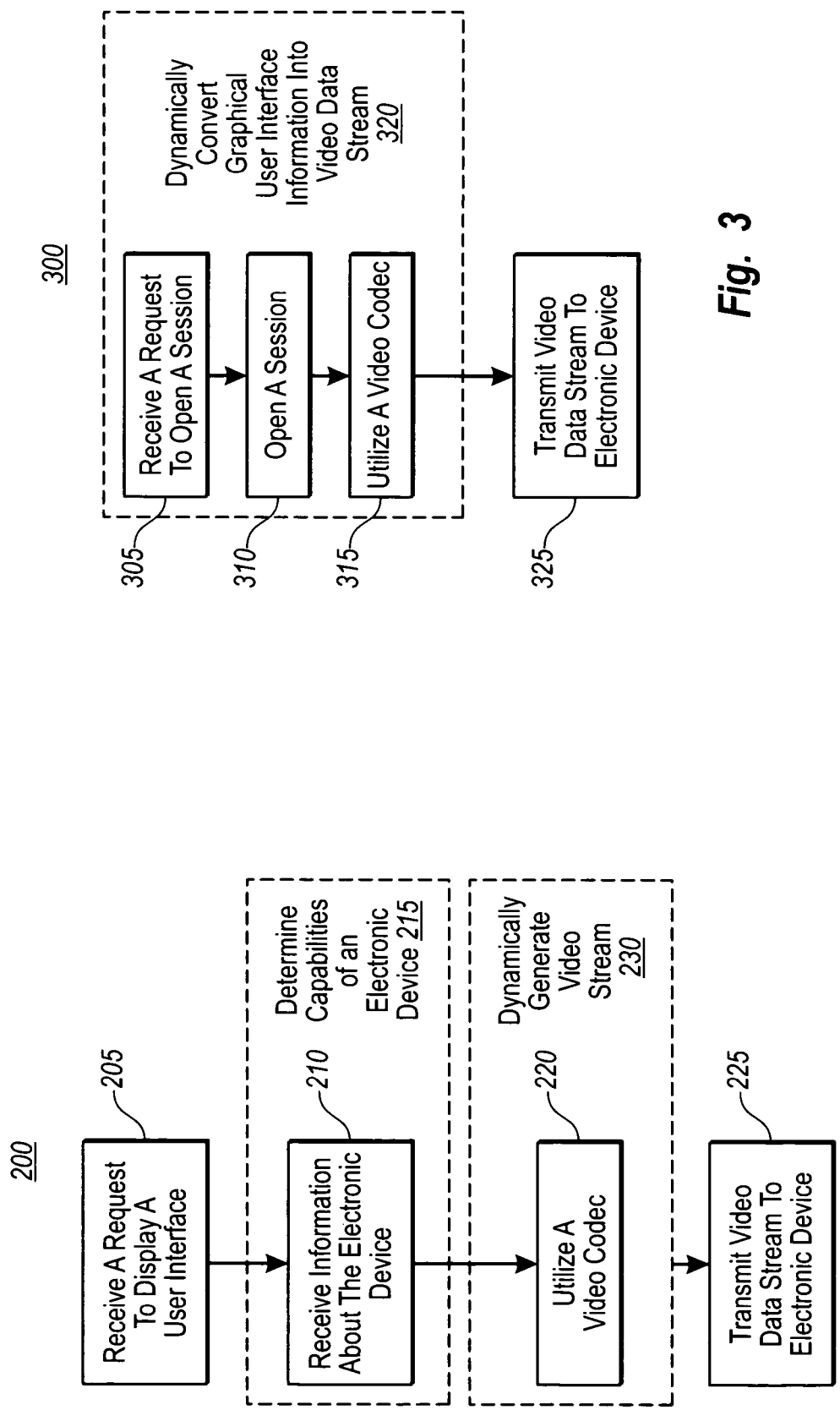

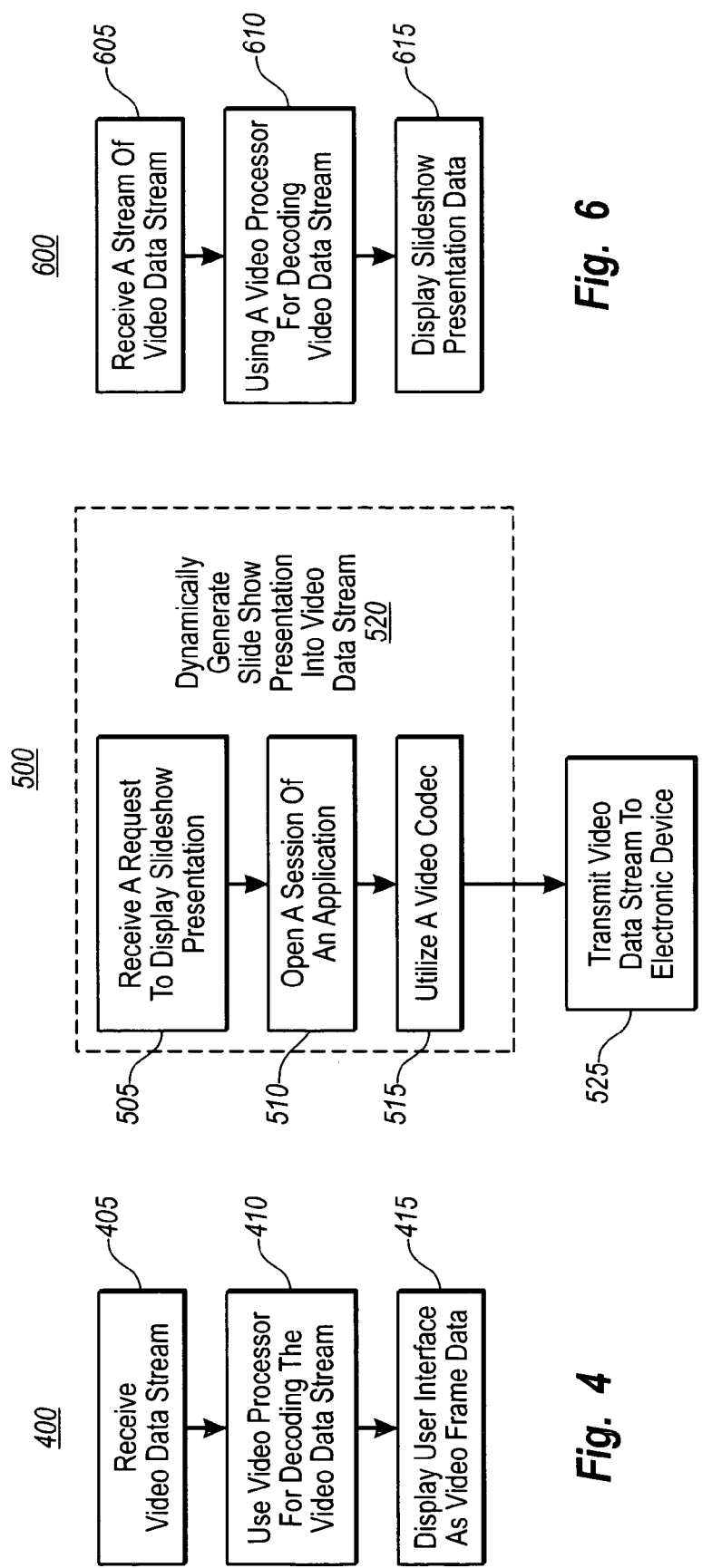

RENDERING GRAPHICS/IMAGE DATA USING DYNAMICALLY GENERATED VIDEO STREAMS

CROSS-REFERENCE TO RELATED APPLICATIONS

This is a continuation of U.S. patent application Ser. No. 10/917,645, filed on Aug. 13, 2004.

BACKGROUND OF THE INVENTION

1. The Field of the Invention

The present invention generally relates to displaying graphical and image data on electronic devices in an entertainment network, e.g., a home entertainment network. More particularly, the present invention provides for dynamically generating video data streams for transferring graphical/image data from a host computing device to an electronic device—that typically has limited resources—for rendering the data.

2. Background and Related Art

Computerized systems provide many advantages towards people's ability to perform tasks. To enable these advantages, computer systems often come equipped with (or are expandable to include) multiple hardware devices that can store or read data or enable a software program to perform a specific action on data. Such devices can include, e.g., a hard drive, a Compact Disk (i.e., CDROM, CDRW, etc.), a Universal Serial Bus (USB) device (e.g., a printer, a scanner, etc.), and so on. Present computer systems also commonly have installed there on multiple software (or "applications") programs such as a word processing program, a spread sheet program, an imaging program, and an electronic mail program, which instruct the devices to perform specific actions on the data.

Indeed, the computer system's ability to process information has transformed the way we live and work. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems. Processing capabilities continue to be incorporated into devices that traditionally did not have such processing power. Accordingly, the diversity trend of computing systems will likely increase.

This increase in computing resources has partially driven the need for coupling computer systems to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

More recently, various operating systems and frameworks have allowed single applications to be run simultaneously by multiple users at different computing systems. This "session-oriented" extension turns an ordinary computer into a centralized, timeshared server similar to mainframes and dumb terminals. The difference is that these extensions provide a graphical interface, whereas mainframes provide only character-based interfaces. All the data processing is performed in the server/host computer, and the client displays only the user interface and screen changes. Such centralized processing power, as well as the advancement in consumer electronic devices, has been the catalyst for the movement of the digital-home network.

As the advent of the digital-home network evolves consumers are discovering the benefits of connecting their personal computers to other consumer electronic devices. For example, by storing music, digital photos, movies, and other content on their personal computers and interfacing the host computer with various consumer electronic devices (e.g., network televisions, wireless monitors, DVDs, set-top box (STB), or other digital media), consumers can turn their home network into a complete home entertainment system. Such centralized storage and connectivity allows users to easily search, sort, and reproduce content, at a number of different electronic devices. In addition, by utilizing the advancement of session-oriented processing capabilities of a host computer, users can have a rich user experience of various applications at each consumer electronic device, without having to be physically at the host computer.

Usually, the central or host computer of a home network is more powerful than the consumer electronic devices. Creating a home network in this fashion—i.e., using less powerful electronic devices, for example—alleviates the issues of cost and distribution of computing load. The cost of a home network to a consumer is reduced because the electronic devices typically have limited processing resources and other capabilities, thus they are not as expensive as more intelligent platforms.

Although the reduction in cost is a great benefit, other difficulties arise. For example, in order for an electronic device to render and interact with the user interface (UI) of a session for an application running on the host computer, the consumer electronic device will typically use a UI protocol such as Remote Desktop Protocol (RDP)/Independent Computer Architecture (ICA) or a common language such as HyperText Markup Language (HTML). Such protocols and languages, however, put an extra burden on the electronic device in the form of complexity, hardware capabilities, etc.

Another problem using consumer electronic devices with limited resources in a home network is that a simple processing session for a host computer can appear heavy and burdensome for a consumer electronic device. For example, a slideshow (i.e., the ability to show photos or image data consecutively and in full screens) is typically a very simple process on a host computer. Nevertheless, each image in a slideshow can be several megapixels is size. Accordingly, transferring the data to an electronic device means large bursts across the network—especially wireless networks—and lots of data to be decompressed during playback by the electronic device's central processor unit (CPU). The result is a slideshow that lacks a high level of visual refinement, such as visible painting on the screen, which feels sluggish and cheap to a consumer. This problem is even further elevated by any transitional information associated with the slideshow, such as panning, zooming, etc.

One approach to alleviate the above-identified problem for rendering slideshow presentations on consumer electronic devices is to compile the photos into a video file, which can be transferred to the device. Since the video file must be precompiled, however, this approach does not allow for user interactivity for manipulating the slides, which is often desirable. Accordingly there exits a need for being able to more effectively transmit and render graphical/image data at consumer electronic devices with limited resources for enhancing the user experience.

BRIEF SUMMARY OF THE INVENTION

The above-identified deficiencies and draw backs of current home entertainment networks are over come by the present invention. For example, in an entertainment network environment comprising a host computing device and at least one electronic device that typically has limited resources, the present invention provides for transferring user interface information from the host computing device to the electronic device using dynamically generated video data streams.

Example embodiments provide for receiving a request to open a session of an application for displaying corresponding user interface at an electronic device within an entertainment network. In response to the request, a session on a host computer is opened for generating user interface information for the electronic device. Utilizing a video codec at lease a portion of the user interface information is dynamically converted into a video data stream, which is capable of being processed at the electronic device by a video processor. The video data stream is then transmitted to the electronic device for displaying the user interface.

Other example embodiments provide for dynamically generating a video data stream based on the capabilities of an electronic device. A request to display a user interface on an electronic device is received. Further, information about the electronic device is received for determining the capabilities of the electronic device. Base on the determination, a video data stream is dynamically generated utilizing a video codec, wherein the video data stream includes user interface information corresponding to at least a portion of the user interface. The video data stream is then transmitted to the electronic device for rendering the user interface on a display of the electronic device.

Still other example embodiments provide for an electronic device that can receive a video data stream that contains user interface information and render the user interface on a display. A video data stream is received at an electronic device, which includes user interface information coded in a video codec formant. A video processor is used for decoding at least a portion of the video data stream into video frame data. At least a portion of the user interface is displayed as video frame data on a display of the electronic device.

In still yet other example embodiments, the present invention provides for rendering slideshow presentation information on the display of an electronic device that typically has limited resources. An electronic device may receive a video data stream, which includes slideshow presentation data coded in a video codec format. The slideshow presentation data including image data accessible by host computer. A video processor of the electronic device is used for decoding at least a portion of the video data stream into video frame data. At least a portion of the slideshow presentation data is then displayed as video frame data on a display of the electronic device.

Other example embodiments provided for transferring slideshow presentation information from a host computing device to an electronic device that typically has limited resources for rendering bitmap images. A request to display a slideshow presentation at an electronic device is received. The slideshow presentation configured to include slideshow presentation data corresponding to image data representing one or more bitmaps. In response to the request, a session of an application is opened on a host computer that produces the slideshow presentation data. A video codec is then utilized for dynamically converting the slideshow presentation data into a video data stream that represents the slideshow presentation. The video data stream is then transmitted to the electronic device for rendering the slideshow presentation.

In yet another example embodiment, an entertainment network is provided for rendering bitmap images with transitional information on an electronic device that typically has limited resources. A request to display a slideshow presentation at an electronic device is received. The slideshow presentation is configured to include slideshow presentation data corresponding to image data representing one or more bitmaps. Further, the slideshow presentation is configured to include transitional information that indicates how the image data is to visual represented at one or more moments in time within the slideshow presentation. In response to the request, a session of an application is opened on a host computer that produces the slideshow presentation data. A video codec is utilized for dynamically converting the slideshow presentation data into a video data stream that represents the slideshow presentation. The video data stream is then transmitted to the electronic device for rendering the slideshow presentation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of a method of dynamically generating a video data stream that includes user interface information in accordance with example embodiments;

FIG. 3 illustrates a flow chart of a method of dynamically converting user interface into a video stream based on the capabilities of electronic device in accordance with example embodiments of the present invention;

FIG. 4 illustrates a flow chart of a method of rendering a user interface at an electronic device based on a video data stream received in accordance with example embodiments;

FIG. 5 illustrates a flow chart of a method of dynamically generating slideshow presentation data into a video data stream in accordance with example embodiments of the present invention;

FIG. 6 illustrates a flow chart of a method of using video stream data for displaying a slideshow presentation on an electronic device in accordance with example embodiments.

DETAILED DESCRIPTION OF THE PREFERRED EMBODIMENTS

The present invention extends to methods, systems and computer program products for dynamically generating and rendering graphical/image data on a consumer electronic device that typically has limited resources. The embodiments of the present invention may comprise a special purpose or general-purpose computer including various computer hardware, as discussed in greater detail below.

Generally the present invention provides for the ability to display graphical and/or image data on an electronic device that typically has limited processing resources. More particularly, the present invention allows for user interface (UI) information and slideshow presentation data to be transmitted to and rendered at an electronic in an entertainment network, i.e., a home network. A video codec (Coder/Decoder) on the host computer enables dynamic generation of streamed video representing UI and slideshow presentation generation and transmitting the video data stream to the electronic device. The device is then able to render the UI and slideshow presentation stream using a video processor similar to typical hardware used for rendering video.

This has the benefit of offering an updating UI and slideshow presentation information in a flexible platform without putting an extra burden on the electronic device in the form of complexity, hardware, capabilities, etc. Visual fidelity is limited only by the power of the host computer and the complexity of the video codec. Although the present invention provides compatibility with application and components that use existing Remote Desktop Protocol (RDP), example embodiments also provide for replacing traditional RDP with a local procedure call version.

Figure 1:
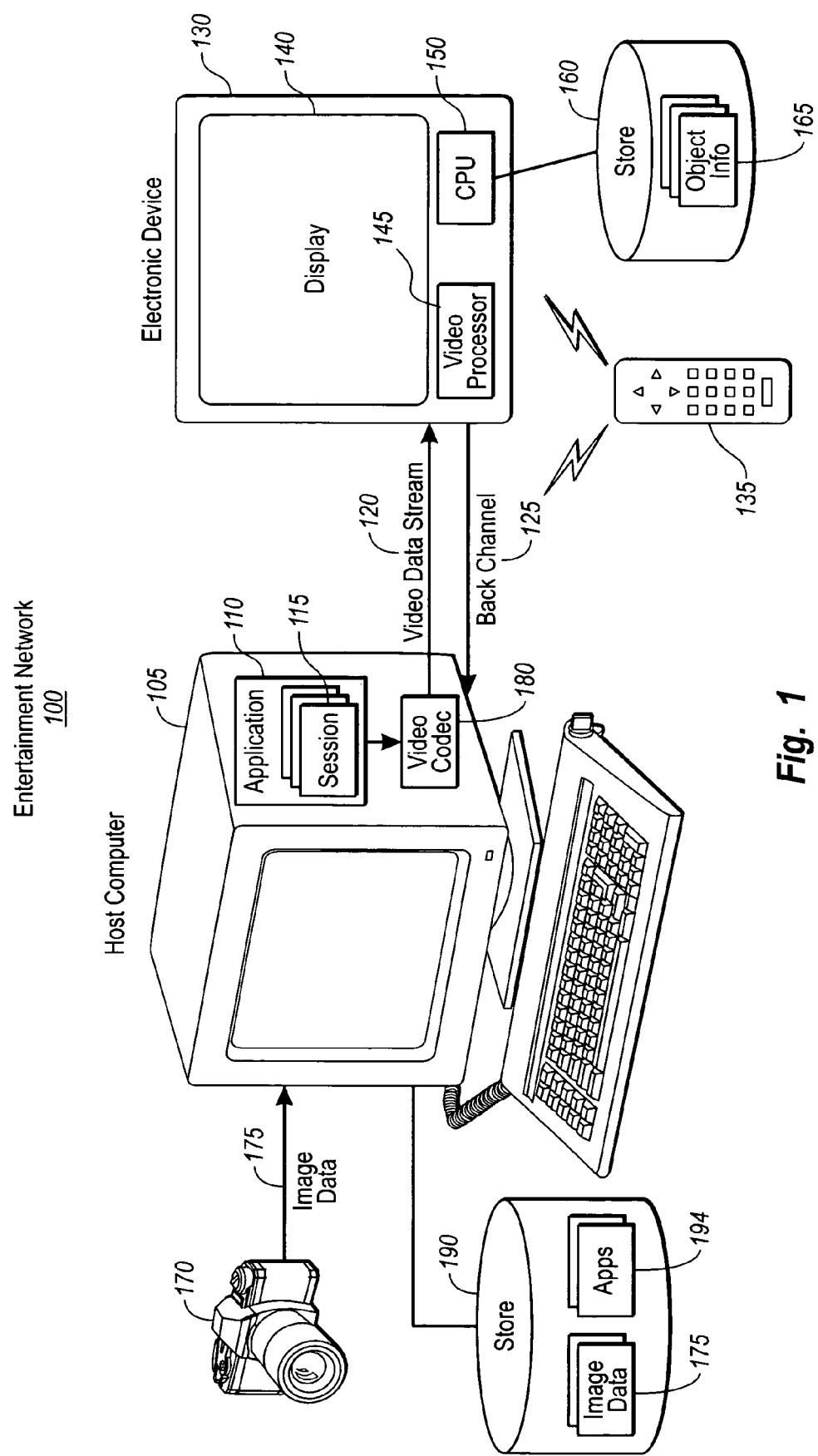
FIG. 1 illustrates an entertainment network capable of streaming user interface and slideshow presentation data from a host computer to an electronic device in accordance with example embodiments of the present invention.

FIG. 1 illustrates a more detailed overview of some of the above-identified embodiments. As shown, entertainment network 100 included a host computer 105 and an electronic device 130, which typically has limited resources, e.g., low processor power, limited memory availability, cheap drive mechanism, limited display, user input capabilities, etc. Referring first to the exemplary embodiments for streaming user interface (UI) information for displaying the UI on an electronic device 130, example embodiments provide that electronic device 130 may make a request to host computer 105 to open a session 115 of an application 110. In response to the request, host computer 105 may access the application 110 from among a plurality of applications 194 in memory, e.g., store 190, and create a session 115.

Rather than rendering the UI to a window, the UI information (or at least a portion thereof, as described below in greater detail below) is processed and passed to video codec 180 for dynamically generating video data stream 120. The processing may be one of re-sampling/resizing the image to the appropriate target resolution, i.e., the resolution supported by the electronic device. Further, example implementations details provide that a presentation service protocol, e.g., RDP, connection is made between the session 115 and an executable process (not shown) running on the host computer 105. Because the video data stream 120 is fed from the executable process, Fall application programming interfaces (APIs), e.g., graphics device interface (GDI), accessible UI is captured and encoded, without modification to the application 110. This results in full compatibility with all media extensibility apps 194 and shell components that already work over such standard protocols, e.g., RDP.

Regardless of the presentation protocol and process used to abstract the UI from the session 115 and the video codec 180, the video codec 180 dynamically converts the UI information into any well know format used to transport video and audio data, e.g., MPEG, MPEG 2, DMV, WMV, etc. The user interface associated with a session 115 may then be transmitted via any well known wire or wireless transports to the electronic device via a video; data stream 120, which is capable of being processed by a video processor 145 on the electronic device 130. The electronic device 130 receives the video data stream 120 and uses its video processor 145 to decode the video data stream 120 into frame data, which is then rendered on display 140. The electronic device may be anyone of a set top box, DVD, network television set, digital media adapter, etc.

Example embodiments further provide for dynamically generating a video data stream 120 based on a determination of the capabilities of the electronic device. For example, using UPnP AV (Universal Pug-n-Play Audio Video), or any other manual or automatic way to determine and detect the presence of an electronic devise 130 or host computer 105, the capabilities of the electronic device 130 may be assessed by the host computer 105 in determining what portion of the video data stream 120 can support control information, e.g., command data. The capabilities determined may be any one of a central processing unit 150 speed, available bandwidth, sustain bandwidth, resolution of a display 140, color depth of the display amount of memory available, memory access speed, graphically capabilities, etc. It should further be noted that the capabilities themselves may be furthered defined to establish whether or not the control data can be sustained by the electronic device 130. For example, the graphical capabilities may be further assessed to determine whether the electronic device 130 supports alpha blending, 3D image rendering, etc.

After determining the capabilities of the electronic device 130, portions of the video data stream 120 may be processed to include control information. For example, objects associated with the user interface for session 115 may be sent as control information to the electronic device 130. The control information may be passed to the CPU 150, which stores the object information 165 in store 160 for future reference. Subsequently, command data can be sent in to the electronic device 130 for indicating how an instant of the object information 165 is to be manipulated on the electronic device 130. That is, the control information may include command data within the data stream 120 that includes information about sizing, a location, graphical appearance, the behavior, etc., of an instance of the object information 165. The CPU 150 on electronic device 130 may interpret this command data and render the object on display 140 as appropriate. Other UI, e.g., background and other images will still be received via the dynamically generated video data stream 120 in a video codec format and rendered via the video processor 145.

Other example embodiments provide that the dynamic conversion of at least a portion of the UI into the video data stream 120 is formatted by a re-sampling a resizing based on the display capabilities of the electronic device. Further, as previously mentioned, video data stream 120 may include an audio data stream portion.

Yet other example embodiments provide that user input may be received by the host computer 105 that indicates a change in one or more of the portions of the user interface. For example, a remote device 135 may be used to interact with the user interface shown in display 140 of the electronic device 130. When user input is received, the video data stream 120 may be altered in accordance with the desired user input. This user input may be received initially from the electronic device 130 and passed through a back channel 125 to the host computer 105. Alternative embodiments provide that the received signal for the user input may be received directly at the host computer by one or more of an inferred light, microwave, or radio waves, or any other well know means of transferring user input.

Still other example embodiments provide for the ability to render slideshow presentations on the electronic device 130. The present invention improves the visual quality of the slideshow displays on electronic devices, while decreasing the burden on the electronic device's 130's CPU 150. This differs from traditional approaches in that the host computer 105 is generating the slideshow for the electronic device 130.

FIG. 1 illustrates the above example embodiment wherein image data 175 may be received or collected from a number of sources, e.g., store 190, digital camera 170—or any other typical memory card or way to receive and/or access digital bitmap images—by host computer 105. Similar to the above example embodiments regarding the user interface, an application 110 can be opened from the apps 194 in store 190 and a session 115 may be generated to run a slideshow presentation based at least in part on the image data 175 received. Rather than a simple JPEG file transfer to the electronic device 130, example embodiments provide that video codec 180 dynamically generates and process the slideshow presentation data into a video data stream 120, configured to be transmitted to the electronic device 130 for rendering the slideshow presentation on the display 140.

The processing may be one of taking a first image and re-sampling/resizing the image to the appropriate target resolution, i.e., the resolution supported by the electronic device 130, and fed into the codec 180. A second image is also resampled/resized to the target resolution and fed into the codec 180. Further, any transitional information, e.g., pan, zoom, fade, etc., is also fed into codec 180. Once the appropriate information is received, video codec 180 dynamically generates a video data stream 120, which can be sent to the electronic device 130 for processing similar to that described above with regards to the UI. This process is repeated throughout the slide show, or until user input is received.

Other example embodiments provide for receiving transitional information that indicates how the image data is to be visually represented at one or moments in time within the slideshow presentation. For example, remote device 135 may send signals to electronic device 130 or directly to the host computer 105. In the case were the signal from the remote device 135 is received at the host computer, command data may be sent in the video data stream 120 formatted as transitional information as one or more of an animate, pan, zoom, cross-fade, a playing of music, etc. Alternatively, if the command data is received from remote 105 at the electronic device 130, either the CPU 150 can interrupt the command data if capable, otherwise the command data may be sent through the back channel 125 and appropriately processed by host computer 105.

Other example embodiments provide that when the image data 175 represents a series of bitmaps, user input may be received to change the ordering or the display of the series. For example as the slideshow presentation is being displayed on display 140, remote device 135 may receive some user input indicating a change of one or more of a pause, skip stop, fast forward, reverse, etc. In such case, the video data stream 120 will be altered in accordance with the user input received, via the back channel 125, the CPU 150, or directly at host computer 105, as previously described. As with the user interface, the video data stream 120 for the slideshow presentation may be formatted in any standard video/audio format, e.g., MPEG, MPEG 2, DMV, WMV, etc. Of course, other formats for generating video codec are available. Accordingly, the above examples, of video/audio format are used for illustrative purposes only and are not meant to limit or otherwise narrow the scope of the present invention unless otherwise explicitly claimed.

In both the user interface and slideshow presentation examples described above, other exemplary embodiments provide that the control information (e.g., command data) can supersede the user interface or image data. For example, if user control information within the video data stream 120 is received after a portion user interface or image data is received, but before the video frame data is fully processed, the control data can be processed before the full processing of the video frame data. In other words, the present invention allows for the expedition of user input, transitional information, object rendering, etc., for enhancing the user experience.

The present invention may also be described in terms of methods comprising functional steps and/or non-functional acts. The following is a description of steps and acts that may be preformed in practicing the present invention. Usually, functional steps describe the invention in terms of results that are accomplished where as non-functional acts describe more specific actions for achieving a particular result. Although the function steps and the non-functional acts may be described or claimed in any particular order, the present invention is not necessarily limited to any particular order or combination of acts and/or steps. Further, the use acts and/or steps in the recitation of the claim and in the following description of the flow charts for FIGS. 2-6 are used to indicate the desired specific use of such terms.

FIGS. 2-6 illustrate example flow charts for various example embodiments of the present invention. The following description of FIGS. 2-6 will occasionally refer to corresponding elements from FIG. 1. Although reference may be made to a specific element from FIG. 1, such elements are used for illustrative purposes only and are not meant to limit or otherwise narrow the scope of the present invention unless otherwise explicitly claimed.

FIG. 2 illustrates an example flow chart of a method 200 of transferring user interface information from a computing device to an electronic device for rendering a user interface on a display of the electronic device. Method 200 includes an act of receiving 205 a request to display a user interface. For example, host 105 may receive a request (either directly or indirectly) to display a user interface on electronic device 130. Electronic device 130 will typically have limited resources and may be anyone of a set top box, DVD player, network television set, digital media adaptor, etc.

Method 200 also includes a functional result-oriented step for determining 215 the capabilities of an electronic device. Step 215 includes an act of receiving 210 information about the electronic device. For example, host computer 105 may receive information about the capabilities of an electronic device 130. The capabilities may be manually input into host computer 105, or automatically determined upon detection of the electronic device 130 by UPnP AV process. The capabilities determined may be one or more of a central processing 150 speed, available bandwidth, sustained bandwidth, resolution of a display 140, a color depth, a map of memory available, memory access speed, graphic capabilities, etc. Further, the graphic capabilities may be one or more of an alpha-blend and support for 3D image rendering.

Method 200 further includes a functional result-oriented step for dynamically generating 230 a video data stream. Step 230 includes an act of utilizing 220 a video codec. For example, host computer 105 may utilize video codec 180 for a dynamically generating video data stream 120 that includes image data corresponding to at least a portion of graphics for the user interface. The video data stream 120 may be formatted as one or an MPEG, MPEG 2, DMV, WMV, etc. format.

The video data stream 120 may also include control information configured to be processed by a central processing unit 150 in the electronic device 130. The control information may include object info 165 associated with a portion of the user interface configured to be stored 160 by the electronic device 130 for future reference. For instance, the object info 165 may be configured to be used in rendering portions of other UI on the electronic device 130. Further, the control information may include command data, which indicates how an instance of the object info 165 is to be manipulated on the electronic device 130. For example, the command data may include one or more of a sizing, location, the graphical appearance, the behavior, etc., of an instance for the object. Other embodiments provide that the object information may be configured to be used in rendering portions of other user interfaces on the electronic device 130.

Prior to dynamically generating the video stream, example embodiments provide that the user interface information may be formatted by one or more of a re-sampling or resizing based on the display capabilities of the electronic device. Further, the video data stream 120 can include audio data stream portion.

Method 200 also includes and act of transmitting 225 video data stream to the electronic device. For example, host computer 105 may transmit the video data stream 120 to the electronic device 130 for render the user interface, or at least a portion thereof, on a display 140 of the electronic devise 130.

FIG. 3 illustrates a Method 300 wherein user interface information may be transferred from a host computing devise to an electronic computing device for rendering the user interface on a display, wherein the electronic device typically has limited resources. Method 300 includes a result-oriented step for dynamically converting 320 graphical user information into a video data stream. Step 320 includes an act of receiving 305 a request to open a session. For example, host computer 105 may receive a request (either directly or indirectly) from electronic device 130 for displaying user interface corresponding to an application 110 at an electronic device 130 within entertainment network 100. Step 320 also includes an act of open 310 a session. For example, host computer 105 in response to the request may open a session 115 of application 110 for generating user information for the electronic device 130. Step 320 may also include an act of utilizing 315 an encoder. For example, host computer 105 may utilize video codec 180 for dynamically converting at least a portion of the user interface information into a video data stream 120. The video data stream 120 is capable of being processed at the electronic device 130 by a video processor 145.

Method 300 also includes an act of transmitting 325 video data stream to the electronic device. For example, host computer 105 may transmit video data stream 120 to the electronic device 130 for appropriate processing.

Other similar capabilities as described above with regards to Method 200 are also available in Method 300. For example, the video data stream 120 may be formatted as one of MPEG, MPEG 2, DMV, WMV, etc. formats. Further, the electronic device 130 may be one or a set top box, DVD player, network television set, digital media player, etc. Moreover, UPnP AV may be used to detect the presence of the host computer 105, the electronic device 130, or both. Prior to dynamically generating the video stream, example embodiments provide that the user interface information may be formatted by one or more of a re-sampling or resizing based on the display capabilities of the electronic device. Further, the video data stream 120 can include audio data stream portion.

The video data stream 120 may also include control information configured to be processed by a central processing unit 150 in the electronic device 130. The control information may include object info 165 associated with a portion of the user interface configured to be stored 160 by the electronic device 130 for future reference. For instance, the object info 165 may be configured to be used in rendering portions of other UI on the electronic device 130. Further, the control information may include command data, which indicates how an instance of the object info 165 is to be manipulated on the electronic device 130. For example, the command data may include one or more of a sizing, location, the graphical appearance, the behavior, etc., of an instance for the object. Other embodiments provide that the object information may be configured to be used in rendering portions of other user interfaces on the electronic device 130.

In addition both Method 200 and 300 also include example embodiments for receiving user input that indicates a change in one or more portions of the user interface. In such embodiments, the video data stream 120 may be altered in accordance with the user input received. The user input may be received through a back channel 125 associated with a video stream channel used to transmit the video data stream 120. Alternatively, the user input may be received directly from a remote device 135 by conventional means such as inferred light, microwaves, radio waves, etc.

FIG. 4 illustrates a Method 400 of rendering a user interface for an application running at a computing device on a display of the electronic device. Method 400 includes an act of receiving 405 a video data stream. For example, electronic device 130 may receive a video data stream 120 from host computer 105. The video data stream 120 includes user interface information coded in a video codec format. For example, the video data stream 120 may be formatted as one of MPEG, MPEG 2, DMV, WMV, etc. formats. Further, the electronic device 130 may be one or a set top box, DVD player, network television set, digital media player, etc. Moreover, UPnP AV may be used to detect the presence of the host computer 105, the electronic device 130, or both.

Method 400 also includes an act of using 410 a video processor for decoding the video data screen. For example, video processor 145 and electronic device 130 may be utilized for decoding at least a portion of the video data stream 120 into video frame date.

Method 400 further includes an act of displaying 415 user interface as video frame data. For example, electronic device 130 may render on display 140 a portion of the user interface as video frame data.

Method 400 also includes an act of transmitting user input that indicates a change in one or more portions of the user interface. In such instance, an altered video data stream 120 may be received in accordance with the user input. The user input may be transmitted through a back channel associated with a video channel used to transmit the video data stream 120. The user input may be received at the electronic device 130 from a remote device 135 by one or more of inferred light waves, micro waves, radio waves, etc.

Similar to Method 200 and 300, the video data stream 120 in Method 400 may also include control information configured to be processed by a central processing unit 150 in the electronic device 130. The control information may include object info 165 associated with a portion of the user interface configured to be stored 160 by the electronic device 130 for future reference. For instance, the object info 165 may be configured to be used in rendering portions of other UI on the electronic device 130. Further, the control information may include command data, which indicates how an instance of the object info 165 is to be manipulated on the electronic device 130. For example, the command data may include one or more of a sizing, location, the graphical appearance, the behavior, etc., of an instance for the object. Other embodiments provide that the object information may be configured to be used in rendering portions of other user interfaces on the electronic device 130.

FIG. 5 illustrates a Method 500 for transferring slideshow presentation information from a host computing device to an electronic device for rendering a slideshow presentation, wherein the electronic device typically has limited resources for rendering bitmap images. Method 500 includes a result-oriented step for dynamically generating 520 slideshow presentation information into a video data stream. Step for 520 may include and act of receiving 505 a request to display a slideshow presentation. For example, host computer 105 may receive a request to display a slideshow presentation at electronic device 130. The slideshow presentation having slideshow presentation data that includes image data 175 corresponding to one or more bitmaps.

Step 520 also includes an act of opening 520 a session of an application. For instance, host computer 105 in response to the request to display a slideshow presentation at electronic device 130 may open a session 115 of application 110 for producing the presentation data. Further, step 520 further includes an act of utilizing a video codec. For example, host computer 105 can use video codec 180 for dynamically converting the slideshow presentation data, e.g., image data 175, transitional information, etc., into a video data stream 120 that represents the slideshow presentation. The video data stream 120 may be formatted as one of MPEG, MPEG 2, DMV, WMV, etc. formats.

Method 500 then includes and act of transmitting 525 video data stream to an electronic device. For example, host computer 105 after dynamically generating the slideshow presentation data into a video data stream, can transmit the video data stream to the electronic device 130 for rendering the slideshow presentation. The electronic device 130 may be one or a set top box, DVD player, network television set, digital media player, etc. Moreover, UPnP AV may be used to detect the presence of the host computer 105, the electronic device 130, or both.

Method 500 may also include an act of receiving command data that indicates how the image data is to be visually represented at one or more moments in time during the slideshow presentation. The command data may be received by a remote device 135. The command data may be one or more of an animate, pan, zoom, cross-fade, playing music, etc. In such instance, control information is generated with transitional information and included as part of the video data stream 120 and sent to the electronic device 130. The control information to be processed by the central processing unit 150 of the electronic device. Other embodiments provide that the translational information is part of the slideshow presentation generated by the application 110, and that the video data stream 120 includes the transitional information within the control information.

Other embodiments provide that the image data 175 represents a series of bitmaps, and that the Method 500 further includes an act of receiving user input that indicates a change in the ordering or display of the series of bitmaps. The change being one or a pause, skip, stop, fast forward, reverse, etc. In such instance, the video data stream 120 is altered in accordance with the user input received. The user input may be received through a back channel associated with a video stream channel used to transmit the video data stream 120. Alternatively, the user input may be received at the host computer 105 from a remote device 135 by one or more of inferred light waves, micro waves, radio waves, etc.

FIG. 6 illustrates a Method 600 of rendering slideshow presentation information on a display of an electronic device that typically has limited resources for rendering bitmap images. Method 600 includes an act of receiving 605 a video data stream. For example, electronic device 130 may receive a video data stream 120, which includes slideshow presentation data coded in a video codec format. Slideshow presentation data including image data 175 accessible by a host computer 105. The a video data stream 120 may be formatted as one of MPEG, MPEG 2, DMV, WMV, etc. formats. Further, the electronic device 130 may be one or a set top box, DVD player, network television set, digital media player, etc. Moreover, UPnP AV may be used to detect the presence of the host computer 105, the electronic device 130, or both.

Method 600 may also include an act of using 610 a video processor for decoding video data stream. For example, electronic device 130 may utilize video processor 145 for decoding video data stream 120 or at least a portion thereof, into video frame data.

Method 600 may also include and act of displaying 615 slideshow presentation data. For example, electronic device 130 after receiving video data stream 120 may end decoding it, may display at least a portion of the slideshow presentation data as video frame data on display 140 of the electronic device. The slideshow presentation data may further include transitional information that indicates how the image data is to be visually represented at one or more moments in time during the slideshow presentation. The transitional information within the video data stream 120 being processed by a central processing unit 150 of the electronic device 130. The transitional information may be one or more of an animate, pan, zoom, cross-fade, playing music, etc.

Method 600 may also include an act of receiving command data that indicates how the image data is to be visually represented at one or more moments in time during the slideshow presentation. The command data may be received by a remote device 135 and processed by central processing unit 150 of the electronic device 130. The command data may be one or more of an animate, pan, zoom, cross-fade, playing music, etc.

Other embodiments provide that the image data 175 represents a series of bitmaps, and that the Method 600 further includes an act of transmitting to the host computer 105 the user input that indicates a change in the ordering or display of the series of bitmaps. The change being one or a pause, skip, stop, fast forward, reverse, etc. In such instance, an altered video data stream 120 is received in accordance with the user input received. The user input may be transmitted through a back channel associated with a video stream channel used to transmit the video data stream 120. Further, the user may be received at electronic device 130 from a remote device 135 by one or more of inferred light waves, micro waves, radio waves, etc.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices. Computer-executable instructions comprise, for example, instructions and data which cause a general purpose computer, special purpose computer, or special purpose processing device to perform a certain function or group of functions.

Figure 7:
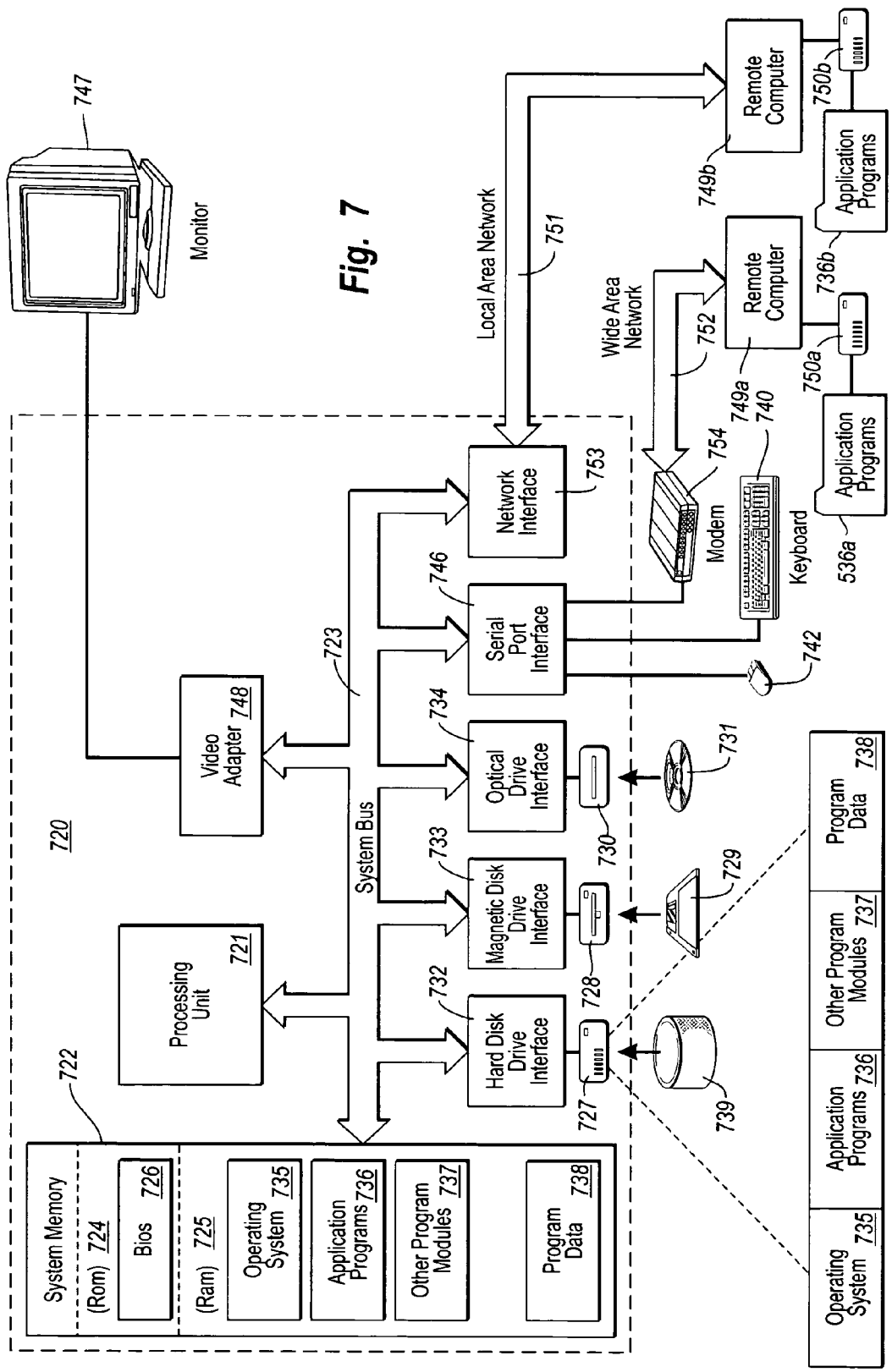
FIG. 7 illustrates an example system that provides a suitable operating environment for present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems; microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724, or RAM 725, including an operating system 735, one or more application programs 736, other program modules, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to the system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an entertainment network comprising a host computer system with a video codec and an electronic device, the host computer system and the electronic device connected by a video stream channel and a back channel, a method of rendering a user interface for an application running at the host computer on a display of the electronic device, the method comprising acts of:

receiving at the electronic device, through the video stream channel, a video data stream, which includes displayable image user interface information coded in a video codec format, the video data stream having been generated by:

the host computer opening an application session for the electronic device at the host computer, the application session for delivering user interface information to the electronic device, the user interface information including displayable image data of a user interface for the application;

the host computer establishing an internal remote desktop protocol connection between the application session and an executable abstraction process within the host computer, the internal remote desktop protocol connection internal to the host computer, the internal remote desktop protocol connection configured for use with existing application program interfaces for sending user interface information from the application session to remote electronic devices, the application session connected to a first end of the internal remote desktop protocol connection and the executable abstraction process connected to a second end of the internal remote desktop protocol connection, the executable abstraction process abstracting the application session from the video codec such that the application session is relieved from having to interact directly with the video codec, the executable abstraction process configured to receive user interface information sent from the application at the second end of the internal remote desktop protocol connection and feed the user interface information to the video codec for conversion into streaming video;

the application session generating user interface information, including displayable image data, the displayable image data configured for rendering in a user interface window at the display of the electronic device;

the application session using remote desktop protocol to transfer a portion of the user interface information, including the displayable image data, through the first end of the internal remote desktop protocol connection;

the executable abstraction process using remote desktop protocol to receive the portion of the user interface information through the second end of the internal remote desktop protocol connection;

the executable abstraction process feeding the portion of user interface information, including the displayable image data, to the video codec for conversion into the video stream; and the video codec converting the portion of user interface information, including the displayable image data, into the video data stream, the video data stream including video data that represents the displayable image data and which is capable of being processed at the electronic device by a video processor to remotely render the user interface for the application at the electronic device, the video data stream further comprising control information, including object information and command data, the object information representing objects of a user interface, the command data indicating how an instance of a represented object is to be manipulated on the electronic device, the command data including one or more of a sizing, a location, the graphical appearance and a behavior of the instance;

using the video processor for decoding at least a portion of the video data stream into video frame data;

displaying at least a portion the user interface, including the displayable image data, as video frame data in the user interface window at the display of the electronic device;

transmitting user input through the back channel that indicates a change in one or more portions of the user interface; and receiving, through the video stream channel, an altered video data stream in accordance with the user input received.

2. The method of claim 1, wherein the user input is received at the electronic device from a remote device by one or more of inferred light waves, micro waves or radio waves.

3. The method of claim 1, wherein the object information is configured to be used in rendering portions of other user interfaces on the electronic device.

4. The method of claim 1, wherein the control information supersedes the video frame data such that when the control information is received after a portion of the video data steam corresponding to the video frame data as been received, but before the video frame data is fully processed, the control data is processed before the processing of the video frame data.

5. The method of claim 1, wherein the video data stream includes an audio data stream portion.

6. The method of claim 1, wherein the video data stream format is one of MPEG, MPEG 2, DMV or WMV.

7. The method of claim 1, wherein the electronic device is chosen from a set top box, DVD player, network television set, or digital media adapter.

8. The method of claim 1, wherein UPnP AV is used to detect the presence of the host computer, the electronic device, or both.

9. In an entertainment network comprising a host computer system with a video codec and an electronic device, the host computer system and the electronic device connected by a video stream channel and a back channel, a method of rendering slideshow presentation information on a display of the electronic device, the method comprising acts of:

receiving at the electronic device, through the video stream channel, a video data stream, which includes slideshow presentation data coded in a video codec format, the slideshow presentation data including still image data accessible by a host computer, the video data stream having been generated by:

the host computer opening an application session for the electronic device at the host computer, the application session for delivering the slideshow presentation data to the electronic device;

the host computer establishing an internal remote desktop protocol connection between the application session and executable abstraction process within the host computer, the internal remote desktop protocol connection internal to the host computer, the internal remote desktop protocol connection configured for use with existing application program interfaces for sending slideshow presentation information from the application session to remote electronic devices, the application session connected to a first end of the internal remote desktop protocol connection and the executable abstraction process connected to a second end of the internal remote desktop protocol connection the executable abstraction process abstracting the application session from the video codec such that the application session is relieved form having to interact directly with the video codec, the executable abstraction process configured to receive slideshow presentation information sent from the application at the second end of the internal remote desktop protocol connection and feed the slideshow presentation information to the video codec for conversion into streaming video;

the application session generating slideshow presentation data, including still image data that represents a series of bitmaps, the still image data configured for rendering at the display of the electronic device;

the application session using the remote desktop protocol to transfer a portion of the slideshow presentation data, including the still image data, through the first end of the internal remote desktop protocol connection;

the executable abstraction process feeding the portion of the slideshow presentation data, including the still image data, to the video codec for conversion into the video stream; and the video codec converting the slideshow presentation data, including still image data, into the video data stream, the video data stream including video data that represents the slideshow presentation and which is capable of being processed at the electronic device by a video processor to remotely render the still image data at the electronic device, the video data stream further comprising control information, the control information including command data, which indicates how the image data is to be visually represented at one or more moments in time within the slideshow presentation, the command data including one or more an animate, pan, zoom, cross-fade or playing music;

using the video processor for decoding at least a portion of the video data stream into video frame data;

displaying at least a portion of the slideshow presentation data, including the still image data, as video frame data on the display of the electronic device;

transmitting user input through the back channel that indicates a change in the ordering or display of the series of bitmaps, the change being one of a pause, skip, stop, fast forward or reverse; and receiving, through the video stream channel, an altered video data stream in accordance with the user input received.

10. The method of claim 9, wherein the slideshow presentation data further includes transitional information that indicates how the image data is to be visually represented at one or more moments in time within the slideshow presentation, the transitional information within the video data stream being processed by a central processing unit of the electronic device.

11. The method of claim 10, wherein the transitional information is one or more an animate, pan, zoom, cross-fade or playing of music.

12. The method of claim 9, wherein the command data is received by a remote device and processed by a central processing unit of the electronic device.

13. The method of claim 9, wherein the user input is received at the electronic device from a remote device by one or more of inferred light waves, micro waves or radio waves.

14. The method of claim 9, wherein the video data stream format is one of MPEG, MPEG 2, DMV or WMV.

15. The method of claim 9, wherein the electronic device is chosen from a set top box, DVD player, network television set, or digital media adapter.

16. The method of claim 9, wherein UPnP AV is used to detect the presence of the host computer, the electronic device, or both.

17. In an entertainment network comprising a host computer system with a video codec and an electronic device, the host computer system and the electronic device connected by a video stream channel and a back channel, a computer program product for implementing a method of rendering a user interface for an application running at the host computer on a display of the electronic device, the computer program product comprising one or more computer readable media having stored thereon computer executable instructions that, when executed by a processor, cause the electronic device to perform the following:

receive at the electronic device, through the video stream channel, a video data stream, which includes displayable image user interface information coded in a video codec format, the video data stream having been generated by:

the host computer opening an application session for the electronic device at the host computer, the application session for delivering user interface information to the electronic device, the user interface information, including displayable image data, of a user interface for the application;

the host computer establishing an internal remote desktop protocol connection between the application session and an executable abstraction process within the host computer, the internal remote desktop protocol connection internal to the host computer, the internal remote desktop protocol connection configured for use with existing application program interfaces for sending user interface information from the application session to remote electronic devices, the application session connected to a first end of the internal remote desktop protocol connection and the executable abstraction process connected to a second end of the internal remote desktop protocol connection the executable abstraction process abstracting the application session from the video codec such that the application session is relieved from having to interact directly with the video codec, the executable abstraction process configured to receive user interface information sent from the application at the second end of the internal remote desktop protocol connection and feed the user interface information to the video codec for conversion into streaming video;

the application session generating user interface information, including displayable image data, the displayable image data configured for rendering in a user interface window at the display of the electronic device;

the application session using remote desktop protocol to transfer a portion of the user interface information, including the displayable image data, through the first end of the internal remote desktop protocol connection;

the executable abstraction process using remote desktop protocol to receive the portion of the user interface information through the second end of the internal remote desktop protocol connection;

the executable abstraction process feeding the portion of user interface information, including the displayable image data, to the video codec for conversion into a video stream; and the video codec converting the portion of user interface information, including the displayable image data, into the video data stream, the video data stream including video data that represents the displayable image data and which is capable of being processed at the electronic device by a video processor to remotely render the user interface for the application at the electronic device, the video data stream further comprising control information, including object information and command data, the object information representing objects of a user interface, the command data indicating how an instance of a represented object is to be manipulated on the electronic device, the command data including one or more of a sizing, a location, the graphical appearance and a behavior of the instance;

use the video processor for decoding at least a portion of the video data stream into video frame data;

display at least a portion the user interface, including the displayable image data, as video frame data in the user interface window at the display of the electronic device;

transmit user input through the back channel that indicates a change in one or more portions of the user interface; and receive, through the back channel, an altered video data stream in accordance with the user input received.

18. The computer program product of claim 17, wherein the object information is configured to be used in rendering portions of other user interfaces on the electronic device.

19. The computer program product of claim 17, wherein the control information supersedes the video frame data such that when the control information is received after a portion of the video data steam corresponding to the video frame data as been received, but before the video frame data is fully processed, the control data is processed before the processing of the video frame data.

20. In an entertainment network comprising a host computer system with a video codec and an electronic device, the host computer system and the electronic device connected by a video stream channel, a computer program product for implementing a method of rendering slideshow presentation information on a display of the electronic device, the computer program product comprising one or more computer readable media having stored thereon computer executable instructions that, when executed by a processor, cause the electronic device to perform the following:

receive at the electronic device, through the video stream channel, a video data stream, which includes slideshow presentation data coded in a video codec format, the slideshow presentation data including still image data accessible by a host computer, the video data stream having been generated by:

the host computer opening an application session for the electronic device at the host computer, the application session for delivering the slideshow presentation data to the electronic device;

the host computer establishing an internal remote desktop protocol connection between the application session and executable abstraction process within the host computer, the internal remote desktop protocol connection internal to the host computer, the internal remote desktop protocol connection configured for use with existing application program interfaces for sending slideshow presentation information from the application session to remote electronic devices, the application session connected to a first end of the internal remote desktop protocol connection and the executable abstraction process connected to a second end of the internal remote desktop protocol connection, the executable abstraction process abstracting the application session from the video codec such that the application session is relieved from having to interact directly with the video codec, the executable abstraction process configured to receive slideshow presentation information sent from the application at the second end of the internal remote desktop protocol connection and feed the slideshow presentation information to the video codec for conversion into streaming video;

the application session generating slideshow presentation data, including still image data that represents a series of bitmaps, the still image data configured for rendering at the display of the electronic device;

the application session using the remote desktop protocol to transfer a portion of the slideshow presentation data, including the still image data, through the first end of the internal remote desktop protocol connection;

the executable abstraction process feeding the portion of the slideshow presentation data, including the still image data, to the video codec for conversion into the video stream; and the video codec converting the slideshow presentation data, including still image data, into the video data stream, the video data stream including video data that represents the slideshow presentation and which is capable of being processed at the electronic device by a video processor to remotely render the still image data at the electronic device, the video data stream further comprising control information, the control information including command data, which indicates how the image data is to be visually represented at one or more moments in time within the slideshow presentation, the command data including one or more an animate, pan, zoom, cross-fade or playing music;

use the video processor for decoding at least a portion of the video data stream into video frame data;

display at least a portion of the slideshow presentation data, including the still image data, as video frame data on the display of the electronic device;

transmit user input through the back channel that indicates a change in the ordering or display of the series of bitmaps, the change being one of a pause, skip, stop, fast forward or reverse; and receive, through the video stream channel, and altered video data stream in accordance with the user input received.

21. The computer program product of claim 20, wherein the slideshow presentation data further includes transitional information that indicates how the image data is to be visually represented at one or more moments in time within the slideshow presentation, the transitional information within the video data stream being processed by a central processing unit of the electronic device.

22. The computer program product of claim 21, wherein the transitional information is one or more an animate, pan, zoom, cross-fade or playing of music.

23. The computer program product of claim 20, wherein the command data is received by a remote device and processed by a central processing unit of the electronic device.

* * * * *